(12) United States Patent
Zhou

(10) Patent No.: US 11,876,625 B2
(45) Date of Patent: Jan. 16, 2024

(54) HYBRID AUTOMATIC REPEAT REQUEST FEEDBACK METHOD AND APPARATUS, USER EQUIPMENT, AND BASE STATION

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 493 days.

(21) Appl. No.: 17/179,384

(22) Filed: Feb. 18, 2021

(65) Prior Publication Data
US 2021/0176016 A1 Jun. 10, 2021

Related U.S. Application Data

(63) Continuation of application No. PCT/CN2018/102005, filed on Aug. 23, 2018.

(51) Int. Cl.
*H04W 72/53* (2023.01)
*H04L 1/1812* (2023.01)
*H04L 1/1829* (2023.01)
*H04W 72/0446* (2023.01)
*H04W 72/0453* (2023.01)

(52) U.S. Cl.
CPC .......... *H04L 1/1819* (2013.01); *H04L 1/1835* (2013.01); *H04L 1/1854* (2013.01); *H04W 72/0446* (2013.01); *H04W 72/0453* (2013.01); *H04W 72/53* (2023.01)

(58) Field of Classification Search
CPC ........ H04W 72/0446; H04W 72/0453; H04W 72/53; H04L 1/1819; H04L 1/1835
See application file for complete search history.

(56) References Cited

U.S. PATENT DOCUMENTS

| 10,925,036 B2* | 2/2021 | Park ..................... H04W 72/04 |
| 11,218,257 B2* | 1/2022 | Li ........................ H04L 1/1867 |
| 2011/0026419 A1 | 2/2011 | Kim et al. |
| 2015/0180616 A1* | 6/2015 | Lee ..................... H04L 1/1835 370/329 |
| 2015/0215825 A1* | 7/2015 | Kim ..................... H04W 72/21 370/331 |

(Continued)

FOREIGN PATENT DOCUMENTS

| CN | 101527622 A | 9/2009 |
| CN | 103312471 A | 9/2013 |

(Continued)

OTHER PUBLICATIONS

ISA State Intellectual Property Office of the People's Republic of China, Written Opinion of the International Searching Authority Issued in Application No. PCT/CN2018/102005, dated Apr. 28, 2019, (8p).

(Continued)

*Primary Examiner* — Jean A Gelin
(74) *Attorney, Agent, or Firm* — Arch & Lake LLP

(57) ABSTRACT

A method and apparatus for feeding back a hybrid automatic repeat request (HARQ) are provided. A user equipment (UE) buffers, in response to detecting that a signal of other equipment is being transmitted at a current time-frequency resource location, HARQ feedback information to be fed back. The UE may further send the HARQ feedback information at a preset time-frequency resource location of at least part of a plurality of preset frequency bands according to priorities of the plurality of preset frequency bands.

17 Claims, 8 Drawing Sheets

If detecting that a signal of other equipment is being transmitted at a current time-frequency resource location, buffer HARQ feedback information to be fed back — S101

Send the HARQ feedback information at a preset time-frequency resource location of at least part of a plurality of preset frequency bands according to priorities of the plurality of preset frequency bands — S102

(56) References Cited

U.S. PATENT DOCUMENTS

| | | | |
|---|---|---|---|
| 2016/0212734 A1 | 7/2016 | He et al. | |
| 2017/0346605 A1* | 11/2017 | Chendamarai Kannan | H04L 1/1874 |
| 2017/0373802 A1* | 12/2017 | Bergström | H04L 1/0027 |
| 2018/0176943 A1* | 6/2018 | Takeda | H04L 5/0048 |
| 2019/0165872 A1* | 5/2019 | Matsuda | H04J 13/16 |
| 2019/0238275 A1* | 8/2019 | Sun | H04W 72/0446 |
| 2019/0260521 A1* | 8/2019 | Luo | H04L 1/1825 |
| 2020/0021402 A1* | 1/2020 | Xu | H04W 72/0446 |
| 2020/0119783 A1* | 4/2020 | Liu | H04W 72/04 |
| 2020/0119854 A1* | 4/2020 | Kim | H04L 1/1864 |
| 2020/0228296 A1* | 7/2020 | Su | H04W 72/04 |
| 2021/0068138 A1* | 3/2021 | Baldemair | H04L 5/0055 |
| 2021/0176017 A1* | 6/2021 | Jia | H04L 1/1896 |

FOREIGN PATENT DOCUMENTS

| | | |
|---|---|---|
| CN | 103517456 A | 1/2014 |
| CN | 105101446 A | 11/2015 |
| CN | 105187173 A | 12/2015 |
| CN | 105634688 A | 6/2016 |
| CN | 106130701 A | 11/2016 |
| CN | 106797572 A | 5/2017 |
| CN | 106888503 A | 6/2017 |
| CN | 108289335 A | 7/2018 |
| WO | 2017191617 A1 | 11/2017 |

OTHER PUBLICATIONS

State Intellectual Property Office of the People's Republic of China, Office Action and Search Report issued in Application No. 201880001864.1, dated Jul. 12, 2021, (12p).

International Search Report of PCT Application No. PCT/CN2018/102005 dated Apr. 28, 2019 with English translation (4p).

Sony, "NR unlicensed design considerations", 3GPP TSG RAN WG1 Meeting #92, Athens, Greece, R1-1802066, Feb. 26-Mar. 2, 2018, (4p).

* cited by examiner

HYBRID AUTOMATIC REPEAT REQUEST FEEDBACK METHOD AND APPARATUS, USER EQUIPMENT, AND BASE STATION

CROSS-REFERENCE TO RELATED APPLICATION

This application is a continuation of International Application No. PCT/CN2018/102005 filed on Aug. 23, 2018, the entire contents of which are incorporated herein by reference in their entirety for all purposes.

TECHNICAL FIELD

The present disclosure relates to the field of communication technology, and more particularly, to a method and apparatus for feeding back a hybrid automatic repeat request, a method and apparatus for determining success or failure of data transmission, user equipment, base stations and computer readable storage media.

BACKGROUND

Unlicensed application of $5^{th}$ Generation (5G) mobile communication technology, e.g., New Radio (NR), is an important application scenario for development of 5G, that is, 5G NR transmission may be applicable in an unlicensed spectrum. The so-called unlicensed spectrum refers to a frequency band that may be used for free without authorization. Common wireless fidelity (Wi-Fi) runs in an unlicensed spectrum.

Since the unlicensed spectrum is not regulated by an operator's deployment network, its application node (AP) needs to overcome an interference problem caused by transmission from another application node. The most common way is to divide different channels in the unlicensed spectrum. Before using a channel for transmission, an AP firstly detects whether there is other transmission on the channel, and if there is no other transmission on the channel, the AP starts its own transmission, which is so-called a Listen Before Talk (LBT) mechanism. The Wi-Fi is a typical system that uses the LBT mechanism.

The use of 5G NR unlicensed transmission in an unlicensed spectrum also faces a problem of interference caused by transmission from another system. For example, when the majority of a Channel Occupation Time (COT) uses for downlink control (Dc) and downlink data (Dd) transmission, there is a single opportunity for uplink transmission at the end of the COT, where the user equipment (UE) can feed back an acknowledgement (ACK) or non-acknowledgement (NACK) associated with the downlink data transmission. However, due to the LBT mechanism, this only opportunity for the uplink transmission may be missed because another system is transmitting. As a result, how to complete ACK or NACK transmission in a case of possible loss of the uplink transmission is a technical problem that needs to be solved.

SUMMARY

In view of this, the present application discloses a method and apparatus for feeding back a hybrid automatic repeat request (HARQ).

According to a first aspect of the present disclosure, a method of feeding back an HARQ is provided. The method may be applied to user equipment (UE), and may include the UE buffering, in response to detecting that a signal of other equipment is being transmitted at a current time-frequency resource location, HARQ feedback information to be fed back. The UE may further send the HARQ feedback information at a preset time-frequency resource location of at least part of a plurality of preset frequency bands according to priorities of the plurality of preset frequency bands.

According to a second aspect of the present disclosure, a method of determining success or failure of data transmission is provided. The method may be applied to a base station, and may include the base station receiving HARQ feedback information from UE at a preset time-frequency resource location in a descending order of priorities corresponding to a plurality of preset frequency bands. The base station may further include determining success or failure of data transmission corresponding to the HARQ feedback information according to the received HARQ feedback information.

According to a third aspect of the present disclosure, a device is provided. The device may include one or more processors, a non-transitory computer-readable memory storing instructions executable by the one or more processors. The one or more processors may be configured to buffer, in response to detecting that a signal of other equipment is being transmitted at a current time-frequency resource location, HARQ feedback information to be fed back. The one or more processors may further be configured to send the HARQ feedback information at a preset time-frequency resource location of at least part of a plurality of preset frequency bands according to priorities of the plurality of preset frequency bands.

It should be understood that the above general description and the following detailed description are only examples and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

A detailed description will now be made to embodiments, examples of which are illustrated in the accompanying drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1:
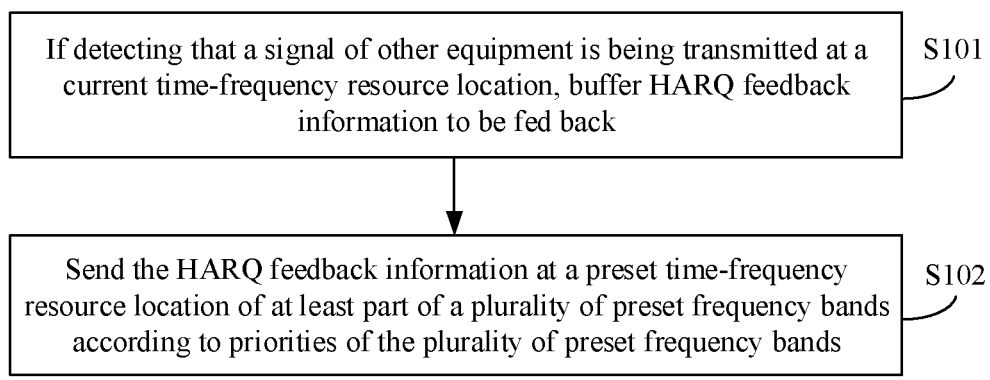
FIG. 1 is a flowchart illustrating a method of feeding back an hybrid automatic repeat request (HARQ), according to an example of the present disclosure.

FIG. 1 is a flowchart illustrating a method of feeding back an hybrid automatic repeat request (HARQ) according to an example of the present application. This example is described from a user equipment (UE) side. As shown in FIG. 1, the method of feeding back an HARQ includes the following.

At step S101, if detecting that a signal of other equipment is being transmitted at a current time-frequency resource location, HARQ feedback information to be fed back is buffered.

At step S102, the HARQ feedback information is sent at a preset time-frequency resource location of at least part of a plurality of preset frequency bands according to priorities of the plurality of preset frequency bands.

Optionally, before step S102, the method may further include: receiving the priorities of the plurality of preset frequency bands and the preset time-frequency resource locations of the plurality of preset frequency bands from a base station. The preset frequency bands may include, but are not limited to, a component carrier (CC), a bandwidth part (BWP), etc., and each of the preset time-frequency resource locations can be used to send HARQ feedback information.

Frequency spans between the plurality of preset frequency bands may increase as the priorities decrease. For example, it is assumed that the plurality of preset frequency bands sent by the base station include CC 1, CC 2 and CC 3, and each CC includes 3 BWPs, namely, BWP 1 to BWP 3. BWP 2 of CC 2 is the first priority. BWP 1 and BWP 3 of CC 2 are the second priority. BWP 2 of CC 1 and BWP 2 of CC 3 are the third priority. A frequency span between BWP 1 and BWP 3 having the second priority is 20 MHz, and a frequency span between BWP 2 of CC 1 and BWP 2 of CC 3 having the third priority is 40 MHz, etc., until a preset upper limit of a frequency span is reached. The preset upper limit of the frequency span is often an upper limit of a capability of a radio frequency device. By setting the frequency spans between the plurality of preset frequency bands to increase as the priorities decrease, a frequency selecting range may be gradually and effectively expanded, thereby increasing the probability of successful feedback in a limited number of attempts.

In the example, if UE detects that a signal of other equipment is being transmitted at a current time-frequency resource location, the UE buffers HARQ feedback information to be fed back, and sends the HARQ feedback information at a preset time-frequency resource location of at least part of a plurality of preset frequency bands according to priorities of the plurality of preset frequency bands.

Sending the HARQ feedback information at the preset time-frequency resource location of at least part of the plurality of preset frequency bands according to the priorities of the plurality of preset frequency bands may include, but is not limited to, any of the following approaches.

In approach 11, the HARQ feedback information is sent at a preset time-frequency resource location of a preset frequency band corresponding to a highest priority, and if the HARQ feedback information fails to be sent, the HARQ feedback information is sent at a preset time-frequency resource location of a preset frequency band corresponding to a next priority, until the HARQ feedback information is sent successfully or the HARQ feedback information has been sent at preset time-frequency resource locations of all preset frequency bands.

Figure 2:
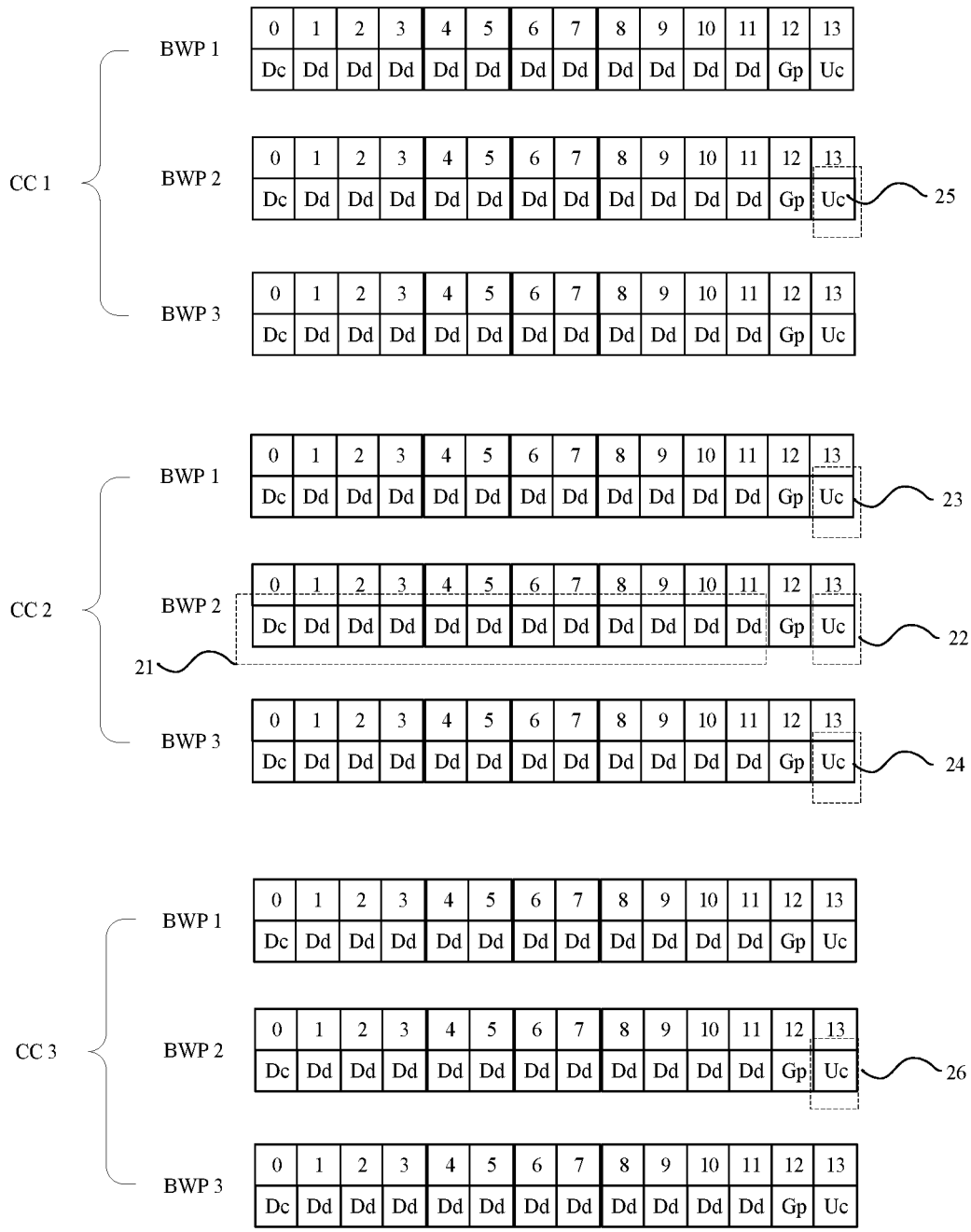
FIG. 2 is a schematic diagram illustrating a preset time-frequency resource location of a preset frequency band, according to an example of the present disclosure.

It is assumed that the plurality of preset frequency bands sent by the base station include CC 1, CC 2 and CC 3, and each CC includes 3 BWPs, namely, BWP 1 to BWP 3. As shown in FIG. 2, BWP 2 of CC 2 has the first priority, BWP 1 and BWP 3 of CC 2 have the second priority, and BWP 2 of CC 1 and BWP 2 of CC 3 have the third priority. Preset time-frequency resource locations of the preset frequency bands are respective locations 22, 23, 24, 25 and 26 in FIG. 2. For example, the UE has downlink transmission on BWP 2 of CC 2, such as location 21 in FIG. 2, but its corresponding uplink transmission is blocked at location 22 due to LBT. The UE, after detecting that the uplink transmission is blocked, buffers the HARQ feedback information to be fed back, and sends the HARQ feedback information at one or more preset time-frequency resource locations of one or more preset frequency bands with the next priority, e.g., locations 23 and 24 in FIG. 2. If the UE re-detects that feedback resources of BWP 1, BWP 2 and BWP 3 of CC 2 are blocked due to LBT, the UE re-sends the HARQ feedback information at one or more preset time-frequency resource locations of one or more preset frequency bands with the next priority, e.g., locations 25 and 26 in FIG. 2.

In an approach 12, sets for the preset time-frequency resource locations of the plurality of preset frequency bands are determined according to a descending order of priorities, and in an order of the determined sets, the HARQ feedback information is sent at a preset time-frequency resource location of a preset frequency band corresponding to a current set, until the HARQ feedback information is sent successfully or the HARQ feedback information has been sent at preset time-frequency resource locations of all preset frequency bands.

For example, according to a descending order of priorities, preset time-frequency resource locations of preset frequency bands corresponding to every two priorities may be regarded as a set. Continuing to take FIG. 2 as an example, preset time-frequency resource locations of preset frequency bands corresponding to the first priority and the second priority may be regarded as a first set, and preset time-frequency resource locations of preset frequency bands corresponding to the third priority may be regarded as a second set, so that the UE may first try to send the HARQ feedback information at locations 22, 23 and 24 shown in FIG. 2 (corresponding to the first set). The base station tries to read the HARQ feedback information at these locations, and as long as a piece of the HARQ feedback information is read successfully at one location, the feedback can be considered successful.

In addition, optionally, when the HARQ feedback information and other HARQ feedback information are sent at an identical preset time-frequency resource location of an identical preset frequency band, it is possible to bundle the HARQ feedback information and the other HARQ feedback information, and send the bundled information at the identical preset time-frequency resource location of the identical preset frequency band.

For example, the UE sends the HARQ feedback information at locations 22, 23 and 24 shown in FIG. 2, and these three locations may need to send own feedback associated with corresponding downlink transmission. When such a conflict occurs, an AND/OR operation may be used to bundle pieces of HARQ feedback information to reduce an amount of HARQ feedback information transmitted.

Optionally, the method may further include: when the HARQ feedback information is sent at the preset time-frequency resource location of at least part of the plurality of preset frequency bands according to the priorities of the plurality of preset frequency bands, not turning on a radio frequency device corresponding to a preset frequency band without data transmission, so as to save power consumption of the UE, and thereby saving electrical power of the UE.

The priority of a frequency band may be affected by a capability of a radio frequency device. For example, a CC having the first priority is a CC supported by radio frequency device 1, and a CC having the second priority is a CC supported by radio frequency device 2. When there is no data transmission on the CC having the second priority, radio frequency device 2 does not need to be turned on.

Optionally, the method may further include: if HARQ feedback success confirmation information from the base station is received, stopping sending the HARQ feedback information.

For example, if the UE sends the HARQ feedback information successfully at any of locations 22, 23 and 24 in FIG. 2, the base station carries HARQ feedback success confirmation information in downlink control signaling in a PDCCH during a next transmission unit, for example, a slot. In this way, the UE does not need to send the HARQ feedback information at locations 25 and 26 which are corresponding to the second set.

In addition, optionally, the UE, after having tried all possible preset time-frequency resource locations within a certain time period according to configured priorities, or having tried all possible preset time-frequency resource locations a certain number of times, stops trying.

In the example, if it is detected that a signal of other equipment is being transmitted at a current time-frequency resource location, HARQ feedback information to be fed back is buffered, and the HARQ feedback information is sent at a preset time-frequency resource location of at least part of a plurality of preset frequency bands according to priorities of the plurality of preset frequency bands. Thus, in an unlicensed spectrum, HARQ feedback is sent at different locations in the frequency domain when the HARQ feedback is blocked at the current location, thereby increasing the probability of successful feedback.

Figure 3:
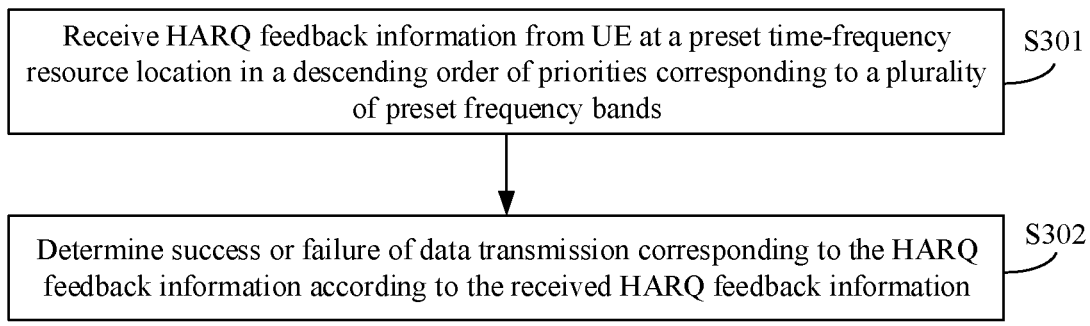
FIG. 3 is a flowchart illustrating a method of determining success or failure of data transmission, according to an example of the present disclosure.

FIG. 3 is a flowchart illustrating a method of determining success or failure of data transmission according to an example of the present application. This example is described from a base station side. As shown in FIG. 3, the method includes the following.

At step S301, HARQ feedback information from UE is received at a preset time-frequency resource location in a descending order of priorities corresponding to a plurality of preset frequency bands.

Optionally, before the step S301, the method may further include: configuring, for the UE, priorities of the plurality of preset frequency bands and preset time-frequency resource locations of the plurality of preset frequency bands; and sending, to the UE, the priorities of the plurality of preset frequency bands and the preset time-frequency resource locations of the plurality of preset frequency bands. For example, the priorities of the plurality of preset frequency bands and the preset time-frequency resource locations of the plurality of preset frequency bands may be send to the UE through broadcast signaling, physical layer control signaling, upper layer RRC signaling, or media access control (MAC) control element (CE) signaling.

The preset frequency bands may include, but are not limited to, a component carrier (CC), a bandwidth part (BWP), etc., and each of the preset time-frequency resource locations can be used to send HARQ feedback information.

Frequency spans between the plurality of preset frequency bands may increase as the priorities decrease. For example, it is assumed that the plurality of preset frequency bands sent by the base station include CC 1, CC 2 and CC 3, and each CC includes 3 BWPs, namely, BWP 1 to BWP 3. BWP 2 of CC 2 is the first priority. BWP 1 and BWP 3 of CC 2 are the second priority. BWP 2 of CC 1 and BWP 2 of CC 3 are the third priority. A frequency span between BWP 1 and BWP 3 having the second priority is 20 MHz, and a frequency span between BWP 2 of CC 1 and BWP 2 of CC 3 having the third priority is 40 MHz, etc., until a preset upper limit of a frequency span is reached. The preset upper limit of the frequency span is often an upper limit of a capability of a radio frequency device. By setting the frequency spans between the plurality of preset frequency bands to increase as the priorities decrease, a frequency selecting range may be gradually and effectively expanded, thereby increasing the probability of successful feedback in a limited number of attempts.

At step S302, success or failure of data transmission corresponding to the HARQ feedback information is determined according to the received HARQ feedback information.

If there are multiple pieces of the received HARQ feedback information, determining success or failure of the data transmission corresponding to the HARQ feedback information according to the received HARQ feedback information may include any of the following approaches.

In approach 21, a priority of a preset frequency band corresponding to each of the plurality of pieces of received HARQ feedback information is obtained, a highest priority is determined from the obtained priorities, and success or failure of the data transmission corresponding to the HARQ feedback information is determined according to a piece of HARQ feedback information corresponding to the determined highest priority.

In approach 22, bit values of the multiple pieces of received HARQ feedback information are voted on, and success or failure of the data transmission corresponding to the HARQ feedback information is determined according to a bit value with more votes.

For this approach, regardless of priorities, bit values of all received HARQ feedback information are voted on. If the number of HARQ feedback information with a bit value 1 is more than that of HARQ feedback information with a bit value 0, a bit value of the HARQ feedback information is considered as 1. If the number of HARQ feedback information with a bit value 1 is less than or equal to that of HARQ feedback information with a bit value 0, the bit value of the HARQ feedback information is considered as 0.

In approach 23, a priority of a preset frequency band corresponding to each of the plurality of pieces of received HARQ feedback information is obtained, a preset number of top-ranked priorities is determined from the obtained priorities, bit values of multiple pieces of received HARQ feedback information corresponding to the preset number of top-ranked priorities are voted on, and success or failure of the data transmission corresponding to the HARQ feedback information is determined according to a bit value with more votes.

For example, the priorities of the preset frequency bands corresponding to the plurality of pieces of received HARQ feedback information include the second priority and the third priority. If there are 3 pieces of HARQ feedback information corresponding to the second priority, and there are 2 pieces of HARQ feedback information corresponding to the third priority, bit values of the 3 pieces of HARQ feedback information having the second priority may be voted on (the HARQ feedback information corresponding to the third priority is ignored), and success or failure of the data transmission corresponding to the HARQ feedback information is determined according to the bit value with more votes.

Optionally, the method may further include: if the HARQ feedback information is successfully read, sending HARQ feedback success confirmation information to the UE, such that the UE no longer sends the HARQ feedback information with respect to the HARQ feedback success confirmation information. The HARQ feedback success confirmation information may be sent to the UE through physical layer control signaling, upper layer RRC signaling, or MAC CE signaling.

In the example, by receiving HARQ feedback information from UE at a corresponding preset time-frequency resource location in a descending order of priorities corresponding to a plurality of preset frequency bands, the probability of receiving the HARQ feedback information is improved, and by determining success or failure of data transmission corresponding to the received HARQ feedback information according to the received HARQ feedback information, success or failure of the data transmission may be determined in time.

Figure 4:
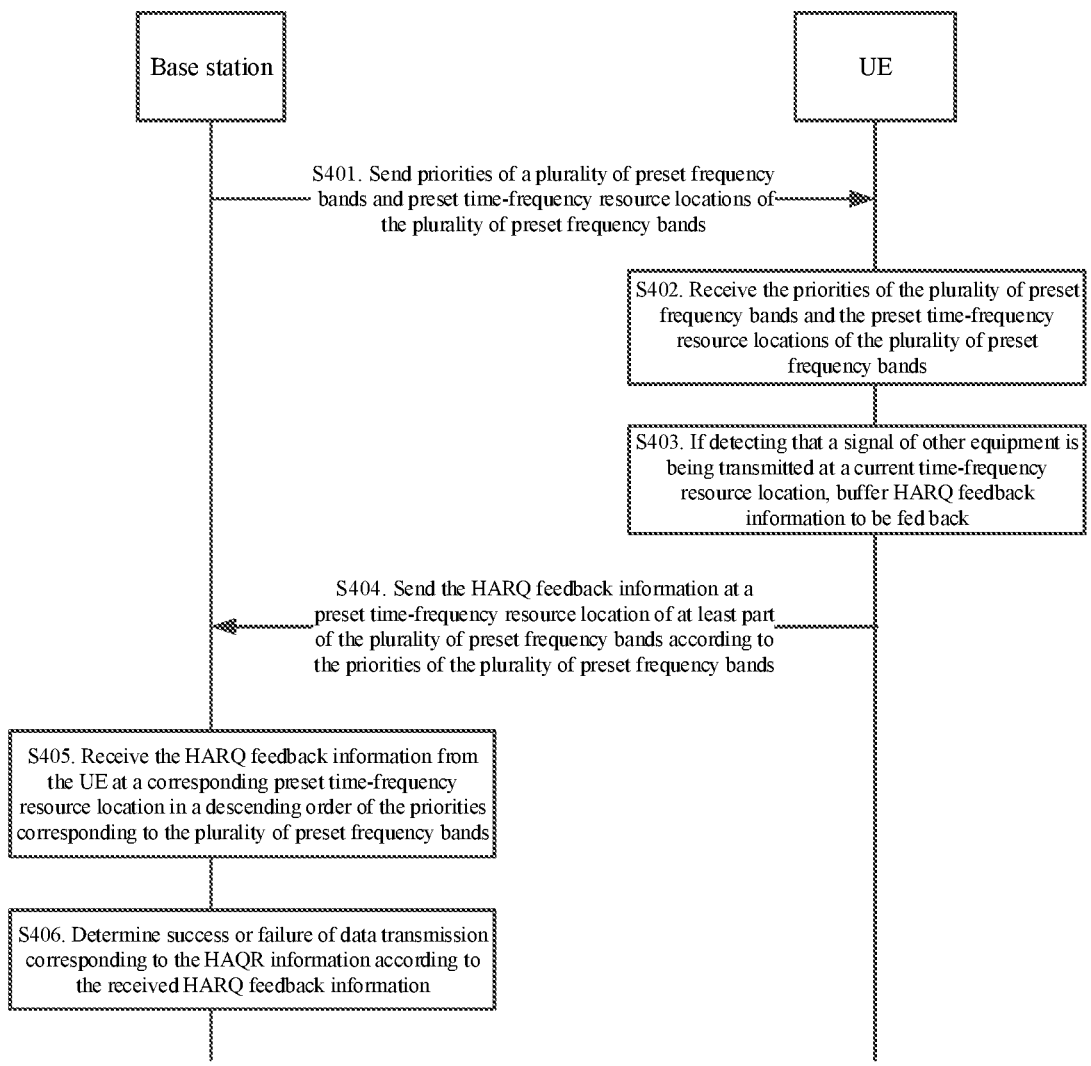
FIG. 4 is a signaling flowchart illustrating a method of determining success or failure of data transmission, according to an example of the present disclosure.

FIG. 4 is a signaling flowchart illustrating a method of determining success or failure of data transmission according to an example of the present application. This example is described from an angle of interaction between a base station and UE. As shown in FIG. 4, the method includes the following.

At step S401, the base station configures, for the UE, priorities of a plurality of preset frequency bands and preset time-frequency resource locations of the plurality of preset frequency bands, and sends, to the UE, the priorities of the plurality of preset frequency bands and the preset time-frequency resource locations of the plurality of preset frequency bands.

At step S402, the UE receives the priorities of the plurality of preset frequency bands and the preset time-frequency resource locations of the plurality of preset frequency bands.

At step S403, if the UE detects that a signal of other equipment is being transmitted at a current time-frequency resource location, the UE buffers HARQ feedback information to be fed back.

At step S404, the UE sends the HARQ feedback information at a preset time-frequency resource location of at least part of the plurality of preset frequency bands according to the priorities of the plurality of preset frequency bands.

At step S405, the base station receives the HARQ feedback information from the UE at a corresponding preset time-frequency resource location in a descending order of the priorities corresponding to the plurality of preset frequency bands.

At step S406, the base station determines success or failure of data transmission corresponding to the HARQ feedback information according to the received HARQ feedback information.

In the example, by interaction between a base station and UE, in an unlicensed spectrum, the UE may implement HARQ feedback at different locations in the frequency domain when the HARQ feedback is blocked at the current location, thereby increasing the probability of successful feedback, and the base station may determine success or failure of data transmission corresponding to the HARQ feedback information according to received HARQ feedback information, thereby determining success or failure of data transmission in time.

Figure 5:
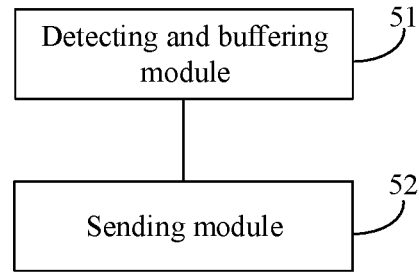
FIG. 5 is a block diagram illustrating an apparatus for feeding back an HARQ, according to an example of the present disclosure.

FIG. 5 is a block diagram illustrating an apparatus for feeding back an HARQ according to an example. This apparatus may be located in UE. As shown in FIG. 5, the apparatus includes the following.

A detecting and buffering module 51 is configured to, if detecting that a signal of other equipment is being transmitted at a current time-frequency resource location, buffer HARQ feedback information to be fed back.

A sending module 52 is configured to send the HARQ feedback information buffered by the detecting and buffering module 51 at a preset time-frequency resource location of at least part of a plurality of preset frequency bands according to priorities of the plurality of preset frequency bands.

The preset frequency bands may include, but are not limited to, a component carrier (CC), a bandwidth part (BWP), etc., and each of the preset time-frequency resource locations can be used to send HARQ feedback information.

Frequency spans between the plurality of preset frequency bands may increase as the priorities decrease. For example, it is assumed that the plurality of preset frequency bands sent by the base station include CC 1, CC 2 and CC 3, and each CC includes 3 BWPs, namely, BWP 1 to BWP 3. BWP 2 of CC 2 is the first priority. BWP 1 and BWP 3 of CC 2 are the second priority. BWP 2 of CC 1 and BWP 2 of CC 3 are the third priority. A frequency span between BWP 1 and BWP 3 having the second priority is 20 MHz, and a frequency span between BWP 2 of CC 1 and BWP 2 of CC 3 having the third priority is 40 MHz, etc., until a preset upper limit of a frequency span is reached. The preset upper limit of the frequency span is often an upper limit of a capability of a radio frequency device. By setting the frequency spans between the plurality of preset frequency bands to increase as the priorities decrease, a frequency selecting range may be gradually and effectively expanded, thereby increasing the probability of successful feedback in a limited number of attempts.

In the example, if UE detects that a signal of other equipment is being transmitted at a current time-frequency resource location, the UE buffers HARQ feedback information to be fed back, and sends the HARQ feedback information at a preset time-frequency resource location of at least part of a plurality of preset frequency bands according to priorities of the plurality of preset frequency bands.

Optionally, the sending module 52 may be configured to: when the HARQ feedback information and other HARQ feedback information are sent at an identical preset time-frequency resource location of an identical preset frequency band, bundle the HARQ feedback information and the other HARQ feedback information, and send the bundled information at the identical preset time-frequency resource location of the identical preset frequency band.

For example, the UE sends the HARQ feedback information at locations 22, 23 and 24 shown in FIG. 2, and these three locations may need to send own feedback associated with corresponding downlink transmission. When such a conflict occurs, an AND/OR operation may be used to bundle pieces of HARQ feedback information to reduce an amount of HARQ feedback information transmitted.

In the example, if it is detected that a signal of other equipment is being transmitted at a current time-frequency resource location, HARQ feedback information to be fed back is buffered, and the HARQ feedback information is sent at a preset time-frequency resource location of at least part of a plurality of preset frequency bands according to priorities of the plurality of preset frequency bands. Thus, in an unlicensed spectrum, HARQ feedback is sent at different locations in the frequency domain when the HARQ feedback is blocked at the current location, thereby increasing the probability of successful feedback.

Figure 6:
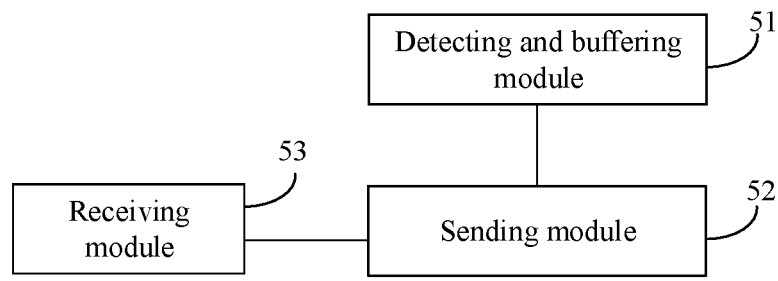
FIG. 6 is a block diagram illustrating another apparatus for feeding back an HARQ, according to an example of the present disclosure.

FIG. 6 is a block diagram illustrating another apparatus for feeding back an HARQ according to an example. As shown in FIG. 6, based on the example shown in FIG. 5, the apparatus may further include the following.

A receiving module 53 is configured to, before the sending module 52 sends the HARQ feedback information buffered by the detecting and buffering module at the preset time-frequency resource location of at least part of the plurality of preset frequency bands according to the priorities of the plurality of preset frequency bands, receive the priorities of the plurality of preset frequency bands and preset time-frequency resource locations of the plurality of preset frequency bands from a base station, where each of the preset time-frequency resource location is used to send HARQ feedback information.

In the example, by receiving priorities of a plurality of preset frequency bands and preset time-frequency resource locations of the plurality of preset frequency bands from a base station, it is provided a condition for subsequently sending HARQ feedback information at the preset time-frequency resource location of at least part of the plurality of preset frequency bands according to the priorities of the plurality of preset frequency bands.

Figure 7:
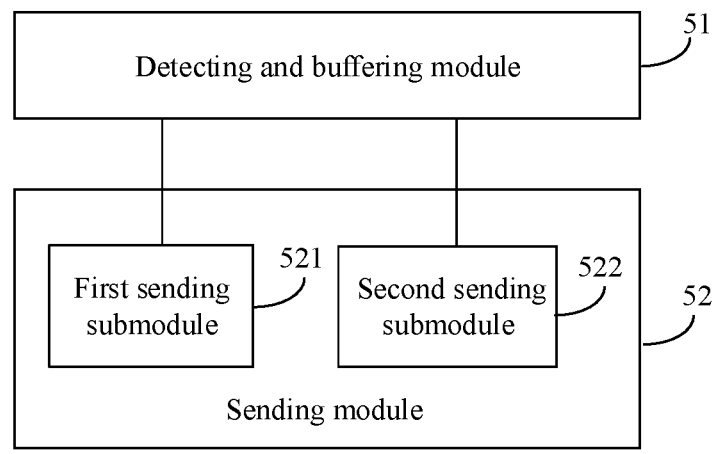
FIG. 7 is a block diagram illustrating another apparatus for feeding back an HARQ, according to an example of the present disclosure.

FIG. 7 is a block diagram illustrating another apparatus for feeding back an HARQ according to an example. As shown in FIG. 7, based on the example shown in FIG. 5, the sending module 52 may include: a first sending submodule 521 or a second sending submodule 522.

The first sending submodule 521 is configured to send the HARQ feedback information at a preset time-frequency resource location of a preset frequency band corresponding to a highest priority, and if the HARQ feedback information fails to be sent, send the HARQ feedback information at a preset time-frequency resource location of a preset frequency band corresponding to a next priority, until the HARQ feedback information is sent successfully or the HARQ feedback information has been sent at preset time-frequency resource locations of all preset frequency bands.

It is assumed that the plurality of preset frequency bands sent by the base station include CC 1, CC 2 and CC 3, and each CC includes 3 BWPs, namely, BWP 1 to BWP 3. As shown in FIG. 2, BWP 2 of CC 2 has the first priority, BWP 1 and BWP 3 of CC 2 have the second priority, and BWP 2 of CC 1 and BWP 2 of CC 3 have the third priority. Preset time-frequency resource locations of the preset frequency bands are respective locations 22, 23, 24, 25 and 26 in FIG. 2. For example, the UE has downlink transmission on BWP 2 of CC 2, such as location 21 in FIG. 2, but its corresponding uplink transmission is blocked at location 22 due to LBT. The UE, after detecting that the uplink transmission is blocked, buffers the HARQ feedback information to be fed back, and sends the HARQ feedback information at one or more preset time-frequency resource locations of one or more preset frequency bands with the next priority, e.g., locations 23 and 24 in FIG. 2. If the UE re-detects that feedback resources of BWP 1, BWP 2 and BWP 3 of CC 2 are blocked due to LBT, the UE re-sends the HARQ feedback information at one or more preset time-frequency resource locations of one or more preset frequency bands with the next priority, e.g., locations 25 and 26 in FIG. 2.

The second sending submodule 522 is configured to determine a set of preset time-frequency resource locations of a plurality of preset frequency bands in a descending order of priorities, and send the HARQ feedback information at a preset time-frequency resource location of a preset frequency band corresponding to a current set, until the HARQ feedback information is sent successfully or the HARQ feedback information has been sent at preset time-frequency resource locations of all preset frequency bands.

For example, according to a descending order of priorities, preset time-frequency resource locations of preset frequency bands corresponding to every two priorities may be regarded as a set. Continuing to take FIG. 2 as an example, preset time-frequency resource locations of preset frequency bands corresponding to the first priority and the second priority may be regarded as a set, and preset time-frequency resource locations of preset frequency bands corresponding to the third priority may be regarded as a set, so that the UE may first try to send the HARQ feedback information at locations 22, 23 and 24 shown in FIG. 2. The base station tries to read the HARQ feedback information at these locations, and as long as a piece of the HARQ feedback information is read successfully at one location, the feedback can be considered successful.

In the example, HARQ feedback information is sent in a variety of ways, which is flexible.

Figure 8:
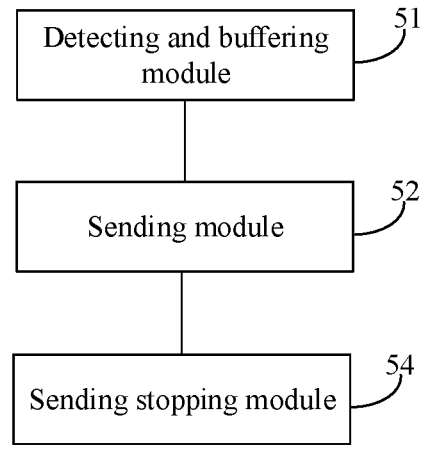
FIG. 8 is a block diagram illustrating another apparatus for feeding back an HARQ, according to an example of the present disclosure.

FIG. 8 is a block diagram illustrating another apparatus for feeding back an HARQ according to an example. As shown in FIG. 8, based on the example shown in FIG. 5, the apparatus may further include the following.

A sending stopping module 54 is configured to stop sending the HARQ feedback information if HARQ feedback success confirmation information from a base station is received.

For example, if the UE sends the HARQ feedback information successfully at any of locations 22, 23 and 24 in FIG. 2, the base station carries HARQ feedback success confirmation information in downlink control signaling in a PDCCH during a next transmission unit, for example, a slot. In this way, the UE does not need to send the HARQ feedback information at locations 25 and 26.

In the example, if HARQ feedback success confirmation information from a base station is received, sending the HARQ feedback information is stopped, which reduces the power consumption of the UE.

Figure 9:
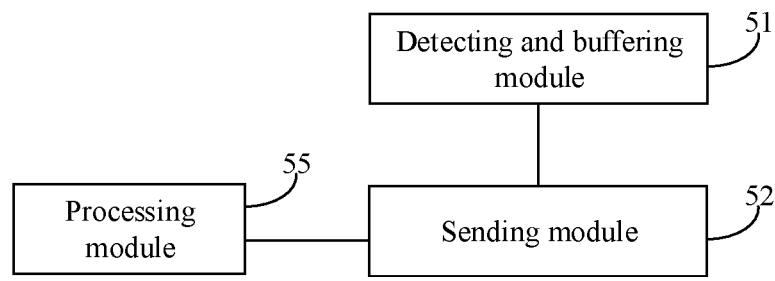
FIG. 9 is a block diagram illustrating another apparatus for feeding back an HARQ, according to an example of the present disclosure.

FIG. 9 is a block diagram illustrating another apparatus for feeding back an HARQ according to an example. As shown in FIG. 9, based on the example shown in FIG. 5, the apparatus may further include the following.

A processing module 55 is configured to, when the sending module 52 sends the HARQ feedback information at the preset time-frequency resource location of at least part of the plurality of preset frequency bands according to the priorities of the plurality of preset frequency bands, not turn on a radio frequency device corresponding to a preset frequency band without data transmission.

The priority of a frequency band may be affected by a capability of a radio frequency device. For example, a CC having the first priority is a CC supported by radio frequency device 1, and a CC having the second priority is a CC supported by radio frequency device 2. When there is no data transmission on the CC having the second priority, radio frequency device 2 does not need to be turned on.

In the example, for a preset frequency band without data transmission, corresponding radio frequency device is not turned on, so as to save power consumption of the UE, and thereby saving electrical power of the UE.

Figure 10:
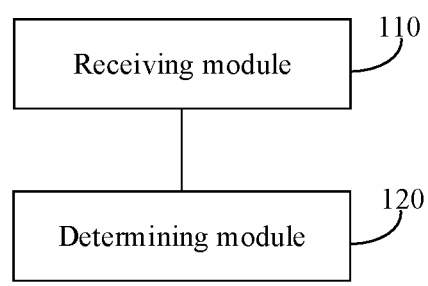
FIG. 10 is a block diagram illustrating an apparatus for determining success or failure of data transmission, according to an example of the present disclosure.

FIG. 10 is a block diagram illustrating an apparatus for determining success or failure of data transmission according to an example. The apparatus may be located in a base station. As shown in FIG. 10, the apparatus includes: a receiving module 110 and a determining module 120.

The receiving module 110 is configured to receive hybrid automatic repeat request (HARQ) feedback information from user equipment (UE) at a preset time-frequency resource location in a descending order of priorities corresponding to a plurality of preset frequency bands.

The preset frequency bands may include, but are not limited to, a component carrier (CC), a bandwidth part (BWP), etc., and each of the preset time-frequency resource locations can be used to send HARQ feedback information.

Frequency spans between the plurality of preset frequency bands may increase as the priorities decrease. For example, it is assumed that the plurality of preset frequency bands sent by the base station include CC 1, CC 2 and CC 3, and each CC includes 3 BWPs, namely, BWP 1 to BWP 3. BWP 2 of CC 2 is the first priority. BWP 1 and BWP 3 of CC 2 are the second priority. BWP 2 of CC 1 and BWP 2 of CC 3 are the third priority. A frequency span between BWP 1 and BWP 3 having the second priority is 20 MHz, and a frequency span between BWP 2 of CC 1 and BWP 2 of CC 3 having the third priority is 40 MHz, etc., until a preset upper limit of a frequency span is reached. The preset upper limit of the frequency span is often an upper limit of a capability of a radio frequency device. By setting the frequency spans between the plurality of preset frequency bands to increase as the priorities decrease, a frequency selecting range may be gradually and effectively expanded, thereby increasing the probability of successful feedback in a limited number of attempts.

The determining module 120 is configured to determine success or failure of data transmission corresponding to the HARQ feedback information according to the HARQ feedback information received by the receiving module 110.

In the example, by receiving HARQ feedback information from UE at a corresponding preset time-frequency resource location in a descending order of priorities corresponding to a plurality of preset frequency bands, the probability of receiving the HARQ feedback information is improved, and by determining success or failure of data transmission corresponding to the received HARQ feedback information according to the received HARQ feedback information, success or failure of the data transmission may be determined in time.

Figure 11:
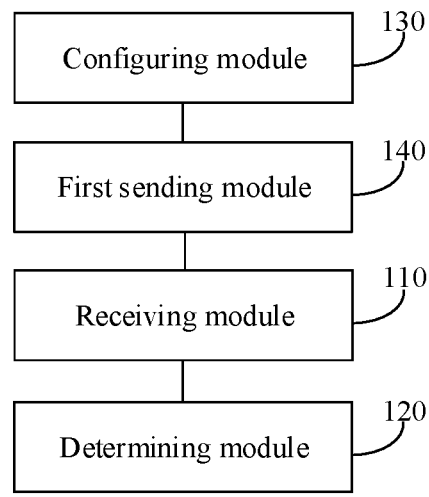
FIG. 11 is a block diagram illustrating another apparatus for determining success or failure of data transmission, according to an example of the present disclosure.

FIG. 11 is a block diagram illustrating another apparatus for determining success or failure of data transmission according to an example. As shown in FIG. 11, based on the example shown in FIG. 10, the apparatus may further include the following.

A configuring module 130 is configured to, before the receiving module 110 receives the HARQ feedback information from the UE at the preset time-frequency resource location in the descending order of the priorities corresponding to the plurality of preset frequency bands, configure, for the UE, priorities of the plurality of preset frequency bands and preset time-frequency resource locations of the plurality of preset frequency bands, where each of the preset time-frequency resource location is used to send HARQ feedback information.

A first sending module 140 is configured to send, to the UE, the priorities of the plurality of preset frequency bands and the preset time-frequency resource locations of the plurality of preset frequency bands configured by the configuring module 130.

The first sending module 140 may send, to the UE through broadcast signaling, physical layer control signaling, upper layer radio resource control (RRC) signaling, or media access control (MAC) control element (CE) signaling, the priorities of the plurality of preset frequency bands and the preset time-frequency resource locations of the plurality of preset frequency bands.

In the example, priorities of the plurality of preset frequency bands and preset time-frequency resource locations of the plurality of preset frequency bands are configured for the UE, and the configured priorities of the plurality of preset frequency bands and preset time-frequency resource locations of the plurality of preset frequency bands are sent to the UE, such that the UE can send HARQ feedback information at preset time-frequency resource location of at least part of the plurality of preset frequency bands according to the priorities of the plurality of preset frequency bands.

Figure 12:
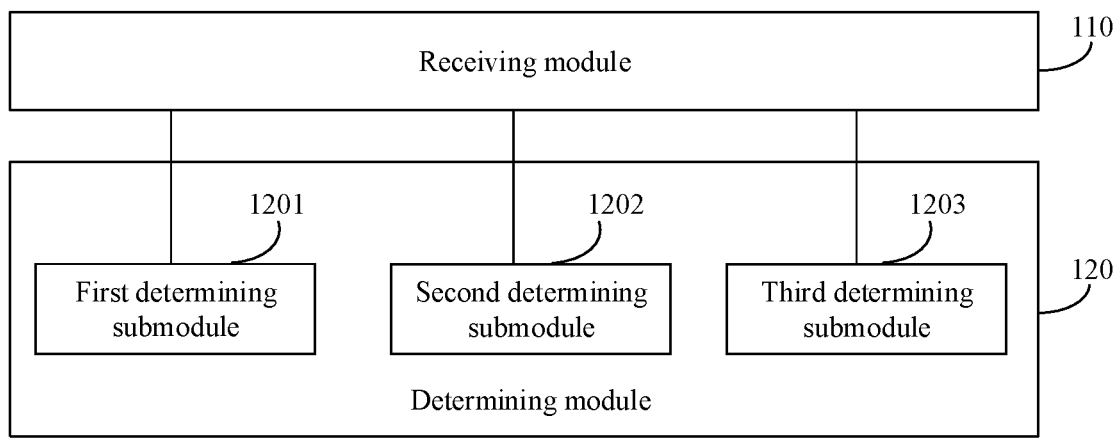
FIG. 12 is a block diagram illustrating another apparatus for determining success or failure of data transmission, according to an example of the present disclosure.

FIG. 12 is a block diagram illustrating another apparatus for determining success or failure of data transmission according to an example. As shown in FIG. 12, based on the example shown in FIG. 10, the determining module 120 may include: a first determining submodule 1201, a second determining submodule 1202, or a third determining submodule 1203.

The first determining submodule 1201 is configured to obtain a priority of a preset frequency band corresponding to each of a plurality of pieces of received HARQ feedback information, determine a highest priority from the obtained priorities, and determine success or failure of the data transmission corresponding to the HARQ feedback information according to a piece of HARQ feedback information corresponding to the determined highest priority.

The second determining submodule 1202 is configured to vote on bit values of the plurality of pieces of received HARQ feedback information, and determine success or failure of the data transmission corresponding to the HARQ feedback information according to a bit value with more votes.

For this approach, regardless of priorities, bit values of all received HARQ feedback information are voted on. If the number of HARQ feedback information with a bit value 1 is more than that of HARQ feedback information with a bit value 0, a bit value of the HARQ feedback information is considered as 1. If the number of HARQ feedback information with a bit value 1 is less than or equal to that of HARQ feedback information with a bit value 0, the bit value of the HARQ feedback information is considered as 0.

The third determining submodule 1203 is configured to obtain a priority of a preset frequency band corresponding to each of the plurality of pieces of received HARQ feedback information, determine a preset number of top-ranked priorities from the obtained priorities, vote on bit values of a plurality of pieces of HARQ feedback information corresponding to the preset number of top-ranked priorities, and determine success or failure of the data transmission corresponding to the HARQ feedback information according to a bit value with more votes.

For example, the priorities of the preset frequency bands corresponding to the plurality of pieces of received HARQ feedback information include the second priority and the third priority. If there are 3 pieces of HARQ feedback information corresponding to the second priority, and there are 2 pieces of HARQ feedback information corresponding to the third priority, bit values of the 3 pieces of HARQ feedback information having the second priority may be voted on (the HARQ feedback information corresponding to the third priority is ignored), and success or failure of the data transmission corresponding to the HARQ feedback information is determined according to the bit value with more votes.

In the above example, success or failure of corresponding data transmission is determined in a variety of ways, which is flexible.

Figure 13:
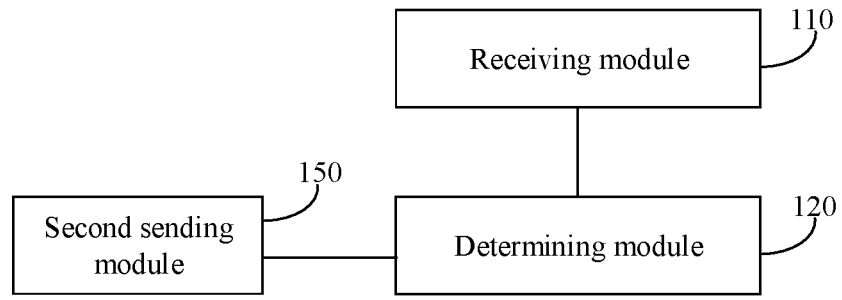
FIG. 13 is a block diagram illustrating another apparatus for determining success or failure of data transmission, according to an example of the present disclosure.

FIG. 13 is a block diagram illustrating another apparatus for determining success or failure of data transmission according to an example. As shown in FIG. 13, based on the example shown in FIG. 10, the apparatus may further include the following.

A second sending module 150 is configured to send HARQ feedback success confirmation information to the UE if the HARQ feedback information is successfully read.

The second sending module 150 may be configured to: send the HARQ feedback success confirmation information to the UE through physical layer control signaling, upper layer radio resource control (RRC) signaling, or media access control (MAC) control element (CE) signaling.

In the example, when HARQ feedback information is successfully read, HARQ feedback success confirmation information is sent to the UE, so that the UE may, based on this, stop sending the HARQ feedback information, which reduces the power consumption of the UE.

Figure 14:
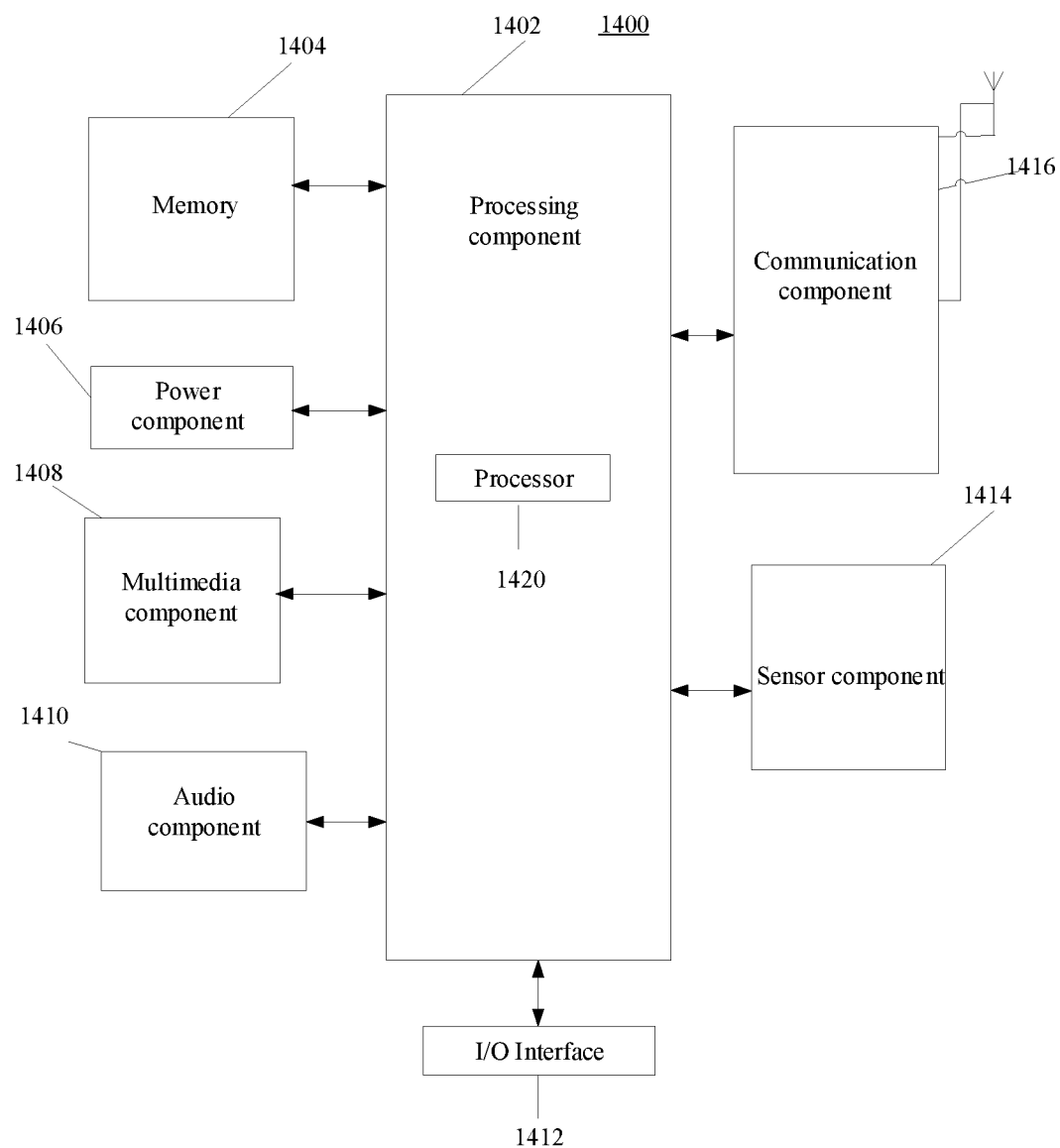
FIG. 14 is a block diagram illustrating an apparatus suitable for feeding back an HARQ, according to an example of the present disclosure.

FIG. 14 is a block diagram illustrating an apparatus suitable for feeding back an HARQ according to an example. For example, an apparatus 1400 may be a mobile phone, a computer, a digital broadcast terminal, a messaging device, a game console, a tablet device, a medical equipment, a fitness equipment, a personal digital assistant, or other UE.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 usually controls the overall operation of the apparatus 1400, such as operations associated with display, telephone calls, data communications, camera operations, and recording operations. The processing component 1402 may include one or more processors 1420 to execute instructions to perform all or part of the steps in the methods described above. Moreover, the processing component 1402 may include one or more modules to facilitate interaction between the processing component 1402 and other components. For example, the processing component 1402 may include a multimedia module to facilitate interaction between the multimedia component 1408 and the processing component 1402.

One of the processors 1420 in the processing component 1402 may be configured to:

if detecting that a signal of other equipment is being transmitted at a current time-frequency resource location, buffer HARQ feedback information to be fed back; and send the HARQ feedback information at a preset time-frequency resource location of at least part of a plurality of preset frequency bands according to priorities of the plurality of preset frequency bands.

The memory 1404 is configured to store various types of data to support operation at the apparatus 1400. Examples of these data include instructions for any application or method operating at the apparatus 1400, contact data, phone book data, messages, pictures, videos, and the like. The memory 1404 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a compact disk.

The power component 1406 provides power to various components of the apparatus 1400. The power component 1406 may include a power management system, one or more power sources, and other components associated with power generated, managed, and distributed for the apparatus 1400.

The multimedia component 1408 includes a screen that provides an output interface between the apparatus 1400 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1408 includes a front camera and/or a rear camera. When the apparatus 1400 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some examples, the audio component 1410 also includes a loudspeaker for outputting an audio signal.

The I/O interface 1412 provides an interface between the processing component 1402 and a peripheral interface module which may be a keyboard, a click wheel, a button, or the like. These buttons may include, but are not limited to a home button, a volume button, a start button, and a lock button.

The sensor component 1414 includes one or more sensors for providing a status assessment in various aspects to the apparatus 1400. For example, the sensor component 1414 may detect an open/closed state of the apparatus 1400, and the relative positioning of components, for example, the component is a display and a keypad of the apparatus 1400. The sensor component 1414 may also detect a change in position of the apparatus 1400 or a component of the apparatus 1400, the presence or absence of a user in contact with the apparatus 1400, the orientation or acceleration/deceleration of the apparatus 1400 and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some examples, the sensor component 1414 may also include an acceleration sensor, a gyro sensor, a magnetic sensor, a pressure sensor, or a temperature sensor.

The communication component 1416 is configured to facilitate wired or wireless communication between the apparatus 1400 and other devices. The apparatus 1400 may access a wireless network based on a communication standard, such as Wi-Fi, 2G or 3G, or a combination thereof. In an example, the communication component 1416 receives broadcast signals or broadcast associated information from an external broadcast management system via a broadcast channel. In an example, the communication component 1416 also includes a near field communication (NFC) module to facilitate short range communication. For example, the NFC module may be implemented based on a radio frequency identification (RFID) technology, an infrared data association (IrDA) technology, an ultra-wide band (UWB) technology, a BLUETOOTH (BT) technology, and other technologies.

In an example, the apparatus 1400 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1404 including instructions, where the instructions are executable by the processor 1420 of the apparatus 1400 to perform the method as described above. For example, the non-transitory computer readable storage medium may be a ROM, a random access memory (RAM), a CD-ROM, a magnetic tape, a floppy disk, and an optical data storage device.

Figure 15:
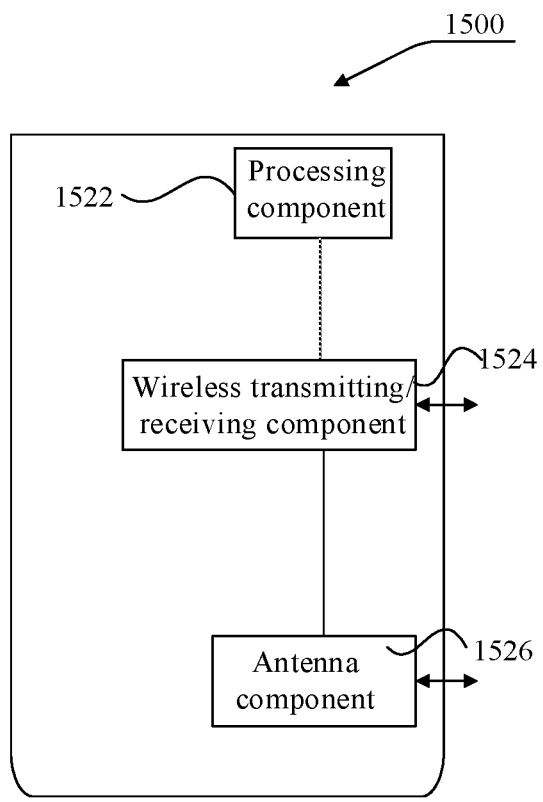
FIG. 15 is a block diagram illustrating an apparatus suitable for determining success or failure of data transmission, according to an example of the present disclosure.

FIG. 15 is a block diagram illustrating an apparatus suitable for determining success or failure of data transmission according to an example. An apparatus 1500 may be provided to a base station. Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors.

One of the processors in the processing component 1522 may be configured to:

receive hybrid automatic repeat request (HARQ) feedback information from user equipment (UE) at a preset time-frequency resource location in a descending order of priorities corresponding to a plurality of preset frequency bands; and determine success or failure of data transmission corresponding to the HARQ feedback information according to the received HARQ feedback information.

In an example, there is also provided a non-transitory computer readable storage medium including instructions, where the instructions are executable by the processing component 1522 of the apparatus 1500 to perform the method of determining success or failure of data transmission as described above. For example, the non-transitory computer readable storage medium may be a ROM, a random access memory (RAM), a CD-ROM, a magnetic tape, a floppy disk, and an optical data storage device.

The technical improvements provided by the examples of the present disclosure may include the following beneficial effects.

If it is detected that a signal of other equipment is being transmitted at a current time-frequency resource location, HARQ feedback information to be fed back is buffered, and the HARQ feedback information is sent at a preset time-frequency resource location of at least part of a plurality of preset frequency bands according to priorities of the plurality of preset frequency bands. Thus, in an unlicensed spectrum, HARQ feedback is sent at different locations in the frequency domain when the HARQ feedback is blocked at the current location, thereby increasing the probability of successful feedback.

By receiving HARQ feedback information from UE at a corresponding preset time-frequency resource location in a descending order of priorities corresponding to a plurality of preset frequency bands, the probability of receiving the HARQ feedback information is improved, and by determining success or failure of data transmission corresponding to the received HARQ feedback information according to the received HARQ feedback information, success or failure of the data transmission may be determined in time.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. A method of feeding back a hybrid automatic repeat request (HARQ), applied to user equipment (UE), and comprising:
   buffering, in response to detecting that a signal of an equipment is transmitted at a current time-frequency resource location, HARQ feedback information to be fed back; and
   sending the HARQ feedback information at a preset time-frequency resource location of at least part of a plurality of preset frequency bands according to priorities of the plurality of preset frequency bands;
   wherein sending the HARQ feedback information at the preset time-frequency resource location of at least part of the plurality of preset frequency bands according to the priorities of the plurality of preset frequency bands comprises:
      bundling, in response to sending the HARQ feedback information and other HARQ feedback information at an identical preset time-frequency resource location of an identical preset frequency band, the HARQ feedback information and the other HARQ feedback information, and
      sending the bundled information at the identical preset time-frequency resource location of the identical preset frequency band.

2. The method according to claim 1, further comprising:
   receiving the priorities of the plurality of preset frequency bands and preset time-frequency resource locations of the plurality of preset frequency bands from a base station, wherein at least one of the preset time-frequency resource locations is used to send HARQ feedback information.

3. The method according to claim 1, wherein sending the HARQ feedback information at the preset time-frequency resource location of at least part of the plurality of preset frequency bands according to the priorities of the plurality of preset frequency bands comprises:
   sending the HARQ feedback information at a preset time-frequency resource location of a preset frequency band corresponding to a highest priority, and sending, in response to failing to send the HARQ feedback information, the HARQ feedback information at a preset time-frequency resource location of a preset frequency band corresponding to a next priority, until the HARQ feedback information is sent successfully or the HARQ feedback information has been sent at preset time-frequency resource locations of all preset frequency bands; or
   determining sets for the preset time-frequency resource locations of the plurality of preset frequency bands according to a descending order of priorities, and sending, in an order of the determined sets, the HARQ feedback information at a preset time-frequency resource location of a preset frequency band corresponding to a current set, until the HARQ feedback information is sent successfully or the HARQ feedback information has been sent at the preset time-frequency resource locations of all preset frequency bands.

4. The method according to claim 1, further comprising:
   stopping, in response to receiving HARQ feedback success confirmation information from a base station, the sending of the HARQ feedback information.

5. The method according to claim 1, further comprising:
   saving power consumption, in response to sending the HARQ feedback information at the preset time-frequency resource location of at least part of the plurality of preset frequency bands according to the priorities of the plurality of preset frequency bands, by not turning on a radio frequency device corresponding to a preset frequency band without data transmission.

6. The method according to claim 1, wherein frequency spans between the plurality of preset frequency bands increases as the priorities decrease.

7. A method of determining success or failure of data transmission, applied to a base station, and comprising:
   receiving hybrid automatic repeat request (HARQ) feedback information from user equipment (UE) at a preset time-frequency resource location in a descending order of priorities corresponding to a plurality of preset frequency bands; and
   determining success or failure of data transmission corresponding to the HARQ feedback information according to the received HARQ feedback information;
   wherein in response to a plurality of pieces of received HARQ feedback information, determining success or failure of the data transmission corresponding to the HARQ feedback information according to the received HARQ feedback information comprises:
   obtaining a priority of a preset frequency band corresponding to at least one of the plurality of pieces of received HARQ feedback information, determining a highest priority from the obtained priorities, and determining success or failure of the data transmission corresponding to the HARQ feedback information according to a piece of HARQ feedback information corresponding to the determined highest priority; or
   voting on bit values of the plurality of pieces of received HARQ feedback information, and determining success or failure of the data transmission corresponding to the HARQ feedback information according to a bit value with more votes; or
   obtaining a priority of a preset frequency band corresponding to at least one of the plurality of pieces of received HARQ feedback information, determining a preset number of top-ranked priorities from the obtained priorities, voting on bit values of a plurality of pieces of HARQ feedback information corresponding to the preset number of top-ranked priorities, and determining success or failure of the data transmission corresponding to the HARQ feedback information according to a bit value with more votes.

8. The method according to claim 7, further comprising:
configuring, for the UE and before receiving the HARQ feedback information from the UE at the preset time-frequency resource location in the descending order of the priorities corresponding to the plurality of preset frequency bands, priorities of the plurality of preset frequency bands and preset time-frequency resource locations of the plurality of preset frequency bands, wherein at least one of the preset time-frequency resource location is used to send HARQ feedback information; and
sending, to the UE, the priorities of the plurality of preset frequency bands and the preset time-frequency resource locations of the plurality of preset frequency bands.

9. The method according to claim 8, wherein sending, to the UE, the priorities of the plurality of preset frequency bands and the preset time-frequency resource locations of the plurality of preset frequency bands comprises:
sending, to the UE through broadcast signaling, physical layer control signaling, upper layer radio resource control (RRC) signaling, or media access control (MAC) control element (CE) signaling, and the priorities of the plurality of preset frequency bands and the preset time-frequency resource locations of the plurality of preset frequency bands.

10. The method according to claim 7, further comprising:
sending, in response to successfully reading the HARQ feedback information, HARQ feedback success confirmation information to the UE.

11. The method according to claim 10, wherein sending the HARQ feedback success confirmation information to the UE comprises:
sending the HARQ feedback success confirmation information to the UE through physical layer control signaling, upper layer radio resource control (RRC) signaling, or media access control (MAC) control element (CE) signaling.

12. The method according to claim 7, wherein frequency spans between the plurality of preset frequency bands increases as the priorities decrease.

13. A device, comprising:
one or more processors, and
a non-transitory computer-readable storage medium for storing instructions executable by the one or more processors,
wherein the one or more processors are configured to implement the method according to claim 7.

14. A device, comprising:
one or more processors, and
a non-transitory computer-readable storage medium for storing instructions executable by the one or more processors,
wherein the one or more processors are configured to:
buffer, in response to detecting that a signal of an equipment is transmitted at a current time-frequency resource location, hybrid automatic repeat request (HARQ)feedback information to be fed back; and
send the HARQ feedback information at a preset time-frequency resource location of at least part of a plurality of preset frequency bands according to priorities of the plurality of preset frequency bands;
wherein sending the HARQ feedback information at the preset time-frequency resource location of at least part of the plurality of preset frequency bands according to the priorities of the plurality of preset frequency bands comprises:
bundling, in response to sending the HARQ feedback information and other HARQ feedback information at an identical preset time-frequency resource location of an identical preset frequency band, the HARQ feedback information and the other HARQ feedback information, and
sending the bundled information at the identical preset time-frequency resource location of the identical preset frequency band.

15. The device according to claim 14, wherein the processor is further configured to:
receive the priorities of the plurality of preset frequency bands and preset time-frequency resource locations of the plurality of preset frequency bands from a base station, wherein at least one of the preset time-frequency resource locations is used to send HARQ feedback information.

16. The device according to claim 14, wherein sending the HARQ feedback information at the preset time-frequency resource location of at least part of the plurality of preset frequency bands according to the priorities of the plurality of preset frequency bands comprises:
sending the HARQ feedback information at a preset time-frequency resource location of a preset frequency band corresponding to a highest priority, and sending, in response to failing to send the HARQ feedback information, the HARQ feedback information at a preset time-frequency resource location of a preset frequency band corresponding to a next priority, until the HARQ feedback information is sent successfully or the HARQ feedback information has been sent at preset time-frequency resource locations of all preset frequency bands; or
determining sets for the preset time-frequency resource locations of the plurality of preset frequency bands according to a descending order of priorities, and sending, in an order of the determined sets, the HARQ feedback information at a preset time-frequency resource location of a preset frequency band corresponding to a current set, until the HARQ feedback information is sent successfully or the HARQ feedback information has been sent at the preset time-frequency resource locations of all preset frequency bands.

17. The device according to claim 14, wherein frequency spans between the plurality of preset frequency bands increases as the priorities decrease.

* * * * *